United States Patent [19]

Schering

[11] Patent Number: 4,470,198
[45] Date of Patent: Sep. 11, 1984

[54] APPARATUS FOR MEASURING THE POSITION OF THE TOOL APEX IN A NUMERICALLY CONTROLLED LATHE OR THE LIKE

[75] Inventor: Stig Schering, Västerås, Sweden

[73] Assignee: SMT Machine Company AB, Västerås, Sweden

[21] Appl. No.: 415,962

[22] Filed: Sep. 8, 1982

[30] Foreign Application Priority Data

Sep. 11, 1981 [SE] Sweden .............................. 8105430

[51] Int. Cl.³ .............................................. B27G 23/00
[52] U.S. Cl. .................................................. 33/185 R
[58] Field of Search ............. 33/185 R, 172 D, 180 R

[56] References Cited

U.S. PATENT DOCUMENTS

| T901,004 | 8/1972 | Schmid | 33/185 R X |
| 1,283,868 | 11/1918 | Nefedov | 33/185 R X |
| 3,050,862 | 8/1962 | Koch | 33/185 R |

FOREIGN PATENT DOCUMENTS 1920723 11/1969 Fed. Rep. of Germany .
394605 7/1977 Sweden .

*Primary Examiner*—Harry N. Haroian
*Attorney, Agent, or Firm*—Beveridge, DeGrandi and Kline

[57] ABSTRACT

An apparatus for measuring the position of the tool apex in relation to predetermined reference points in a numerically controlled lathe or the like comprises a clamp and an instrument, attached to the clamp, for establishing the position of the tool apex. The clamp is adapted, for its localization on the lathe, to cooperate with a recess provided in the spindle and concentric therewith, said clamp being provided, at least at its opposite sides, with abutments which are adapted to bear against the sides of the spindle recess. According to the invention the clamp is pivotally mounted on a holder therefor, said holder being movable, by means of a drive unit provided with an operating means, at right angles towards and away from the spindle just opposite the spindle recess, while the clamp is adapted to pivot, by means of a drive unit provided with an operating means, toward and away from the position in which it is situated just opposite the spindle recess. The instrument for establishing the position of the tool apex is adapted to be situated with its sensing means in the plane of movement of the tool apex when the clamp with its abutments bears against the sides of the spindle recess, while the instrument is adapted to emit a control impulse upon contact of the sensing means with the tool apex.

8 Claims, 2 Drawing Figures

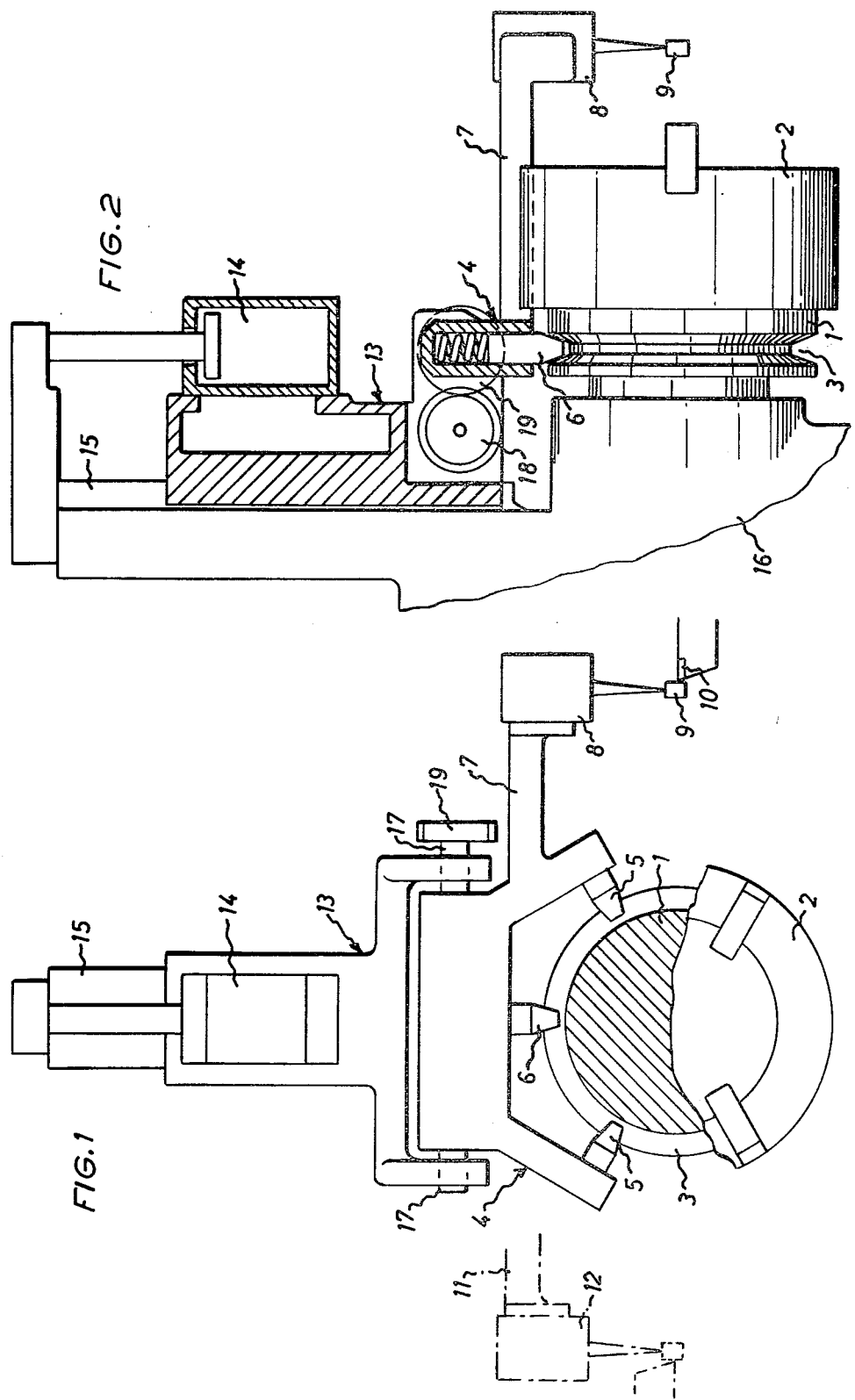

APPARATUS FOR MEASURING THE POSITION OF THE TOOL APEX IN A NUMERICALLY CONTROLLED LATHE OR THE LIKE

The present invention relates to an apparatus for measuring the position of the tool apex in relation to predetermined reference points in a numerically controlled lathe or the like, comprising a clamp and an instrument, attached to the clamp, for establishing the position of the tool apex, said clamp being adapted, for its localization on the lathe, to cooperate with a recess provided on the spindle and concentric therewith, said clamp being provided, at least at its opposite sides, with abutments which are adapted to bear against the sides of the spindle recess.

An apparatus of this type is already known from Swedish Patent Specification No. 394 605 but this involves the disadvantage that it necessitates a manual operation by an operator for carrying out the measurement. This disadvantage is eliminated by the apparatus of the invention which is characterized in that the clamp is pivotally mounted on a holder therefor, said holder being movable, by means of a drive unit provided with an operating means, at right angles towards and away from the spindle just opposite the spindle recess, while the clamp is adapted to pivot, by means of a drive unit provided with an operating means, towards and away from the position in which it is situated just opposite the spindle recess, and in that the instrument, for establishing the position of the tool apex, is adapted to be situated with a sensing means in the plane of movement of the tool apex when the clamp with its abutments bears against the sides of the spindle recess, while the instrument is adapted to emit a control impulse or the like upon contact of the sensing mean with the tool apex. The invention makes it possible to carry out the process automatically, this being a condition for operation without operator.

The invention will be described more fully with reference to the accompanying drawing which illustrates an embodiment, chosen by way of example, of the measuring apparatus cooperating with the spindle on a numerically controlled lathe.

In the drawing:

FIG. 1 is a front elevation of the measuring apparatus; and

FIG. 2 is a side elevation shown partially in section.

1 designates the spindle of the numerically controlled lathe, which is provided, on the part thereof joined to the chuck 2, with a recess 3 which is concentric therewith and provided with conical or plane-parallel flank surfaces.

The measuring apparatus includes a clamp 4 which, for its localisation on the lathe, cooperates with the spindle recess 3. For this purpose it is provided with abutment pins 5 at least on its opposite sides. These pins are rigid, while an abutment pin 6 situated at the centre of the clamp 4 is resilient. In measuring position the pins 5 and 6 are adapted to be brought into fixed contact with the spindle recess 3 as the clamp 4 is moved at right angles towards the spindle 1. The clamp 4 is provided with an arm 7 on which a level indicator 8 is mounted. This indicator 8 is provided with a sensing means consisting of an abutment cube 9 which can actuate the indicator upon mechanical contact with the tool apices 10.

In the cases where the machine is equipped with double slides and tool carriers (with 4 shafts) the clamp 4 is provided with a supplementary arm 11 with indicator 12 on the opposite side of the spindle centre, as indicated by dashed lines.

The clamp 4 is povitally mounted on a holder 13 therefor, which holder 13 is movable from a retracted position to an operative position by means of a drive unit 14 provided with an operating means, at right angles towards and away from the spindle 1 straight opposite the spindle recess 3. According to the preferred embodiment shown, the drive unit consists of a pressure-medium operated cylinder-piston assembly 14. The holder 13 cooperates as a slide with a straight-guide 15 means on the spindle headstock 16, one part of the cylinder-piston assembly 14 being fixedly connected with the spindle headstock 16 while the other part is fixedly connected with the holder 13.

The clamp 4, the pivot shaft 17 of which in the holder 13 is oriented at right angles to the axis of the spindle 1 and situated in the central plane through the spindle recess 3, is adapted to pivot between a retracted position and an extended measuring position. Movement of the clamp between these positions is produced by means of a drive unit 18 provided with an operating means, so that the clamp moves towards and away from the position in which it is situated just opposite the spindle recess 3. The drive unit 18, which preferably consists of a hydraulic motor operating across a gear 19, is adapted to turn the clamp 4 through approximately 180°. During the lathe-turning process the measuring apparatus will thus be given a protected position above the spindle 1 and suitably behind a cover of sheet metal or the like.

The level indicator 8 is adapted to be situated with its sensing means, i.e. the abutment cube 9, in the plane of movement of the tool apex 10 when the clamp 4 with its abutments 5 and 6 bears against the sides of the spindle recess 3 so that it will emit a control impulse or the like upon contact of the abutment cube 9 with the tool apex 10.

The measuring procedure is as follows: The clamp 4 is swung out and then brought into contact with the spindle 1 due to the movement of the holder 13 down towards the spindle recess 3. The abutment cube 9 of the level indicator 8 will thus be in the plane of movement of the tool apex 10. By positioning the tool apex 10 so that it will pass the O-position of the abutment cube 9 the so-called actual value of the apex 10 can be registered and compared to the programmed so-called desired value. The difference can be fed into the control equipment and results in a tool correction.

The invention is not restricted to that described above and shown in the drawing but may be modified within the scope of the appended claims.

What I claim and desire to secure by Letters Patent is:

1. Apparatus for determining a reference location of the apex of a tool in a numerically controlled machine such as a lathe or the like provided with a spindle which has a circumferential recess and rotates about an axis, said apparatus comprising:
   a holder which is supported for movement toward and away from said spindle,
   a clamp which is pivotally mounted on said holder, said clamp being provided with abutments for engaging said recess in the spindle in order to locate the clamp at a given position relative to the spindle,
   an instrument which is attached to and supported by the clamp, said instrument having a sensing means which provides a signal when it is contacted by the apex of a tool of said machine, drive means for pivotally moving said clamp on said holder between a retracted position and an extended position, drive means operable when the clamp is in its extended position for moving the holder from a retracted position where said clamp abutments are aligned with and spaced from said recess to an operative position where the abutments are engaged with said recess, said sensing means of the instrument being at a position where it is engageable by the apex of a tool of the machine when said clamp is in its extended position and said holder is in its operative position.

2. Apparatus according to claim 1 wherein the movement of the clamp on the holder is about a pivot axis which is at right angles to the spindle axis and is coplanar with the circumferential recess in the spindle.

3. Apparatus according to claim 1 wherein the drive means for moving the holder is a pressure-medium operated cylinder-piston assemby.

4. Apparatus according to claim 1 wherein the machine has a spindle headstock provided with a straight guide means, said holder being engaged with and guided by said guide means.

5. Apparatus according to claim 4 wherein the drive means for moving the holder is a pressure-medium operated cylinder-piston assembly which has one part connected to the headstock and another part connected to the holder.

6. Apparatus according to claim 1 wherein the drive means for pivotally moving the clamp is a hydraulic motor which has a gear for moving the clamp.

7. Apparatus according to claim 1 wherein the extent of pivotal movement of the clamp between its retracted and extended position is about 180°.

8. Apparatus according to claim 1 wherein the instrument is a level indicator and the sensing means is an abutment cube.

* * * * *